Patented Apr. 6, 1926.

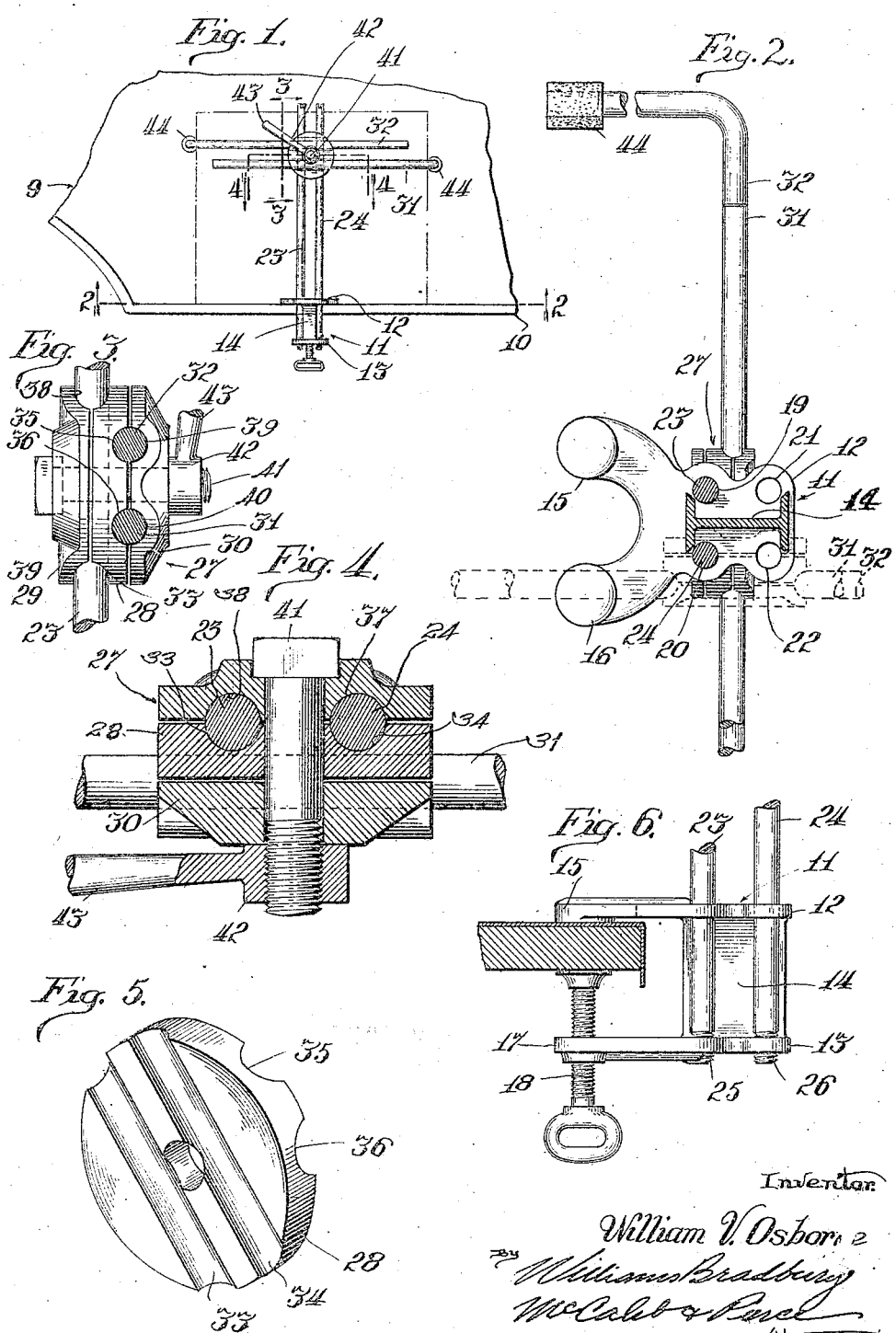

1,579,238

UNITED STATES PATENT OFFICE.

WILLIAM V. OSBORNE, OF RACINE, WISCONSIN.

LUGGAGE CARRIER.

Application filed December 17, 1921. Serial No. 522,980.

*To all whom it may concern:*

Be it known that I, WILLIAM V. OSBORNE, a citizen of the United States, and resident of Racine, in the county of Racine and State of Wisconsin, have invented certain new and useful Improvements in Luggage Carriers, of which the following is a full, clear, concise, and exact description, reference being had to the accompanying drawings, forming a part of this specification.

My invention relates to luggage carriers, and particularly to devices of this kind that are attachable to the running board or other portion of a vehicle for the purpose of embracing and engaging the articles to be carried.

The main object of my invention is to provide a device of the class described having a construction that is especially well adapted for the uses herein set forth. Other important objects of my invention are to provide a device that is quickly attached or detached, and one that is readily adjustable to embrace and engage luggage of various sizes.

The device of my invention is sturdy in construction, cheap to manufacture, and light in weight. When not in use, it may be conveniently carried in the vehicle tool box or elsewhere.

My invention will be fully understood by reference to the accompanying drawings in which—

Figure 1 is a side elevational view of a portion of an automobile provided with my luggage carrier attached to the running board;

Figure 2 is a fragmentary sectional view taken on the line 2—2 of Figure 1;

Figure 3 is a fragmentary view, partly in section and partly in elevation, of a portion of the device;

Figure 4 is a sectional view taken on the line 4—4 of Figure 1;

Figure 5 is an isolated view in perspective of a portion of a locking means forming a part of the device; and Figure 6 is a fragmentary view, partly in section and partly in elevation, of the device when used in a manner different from that shown in Figure 1.

Similar characters of reference refer to similar parts throughout the several views.

In the drawings I have illustrated a portion of a vehicle at 9 in Figure 1, having a running board 10. The device comprises the base 11, having a pair of substantially parallel plates 12 and 13 connected by a web 14.

To provide means for clamping the base 11 in fixed position, the plate 12 is provided with arms 15 and 16, and the plate 13 carries the arm 17. The clamping screw 18 is threaded in the arm 17, so that the running board or other support may be engaged by the arms 15 and 16 and the end of the screw 18. The object in providing the arms 15 and 16 is to prevent rotation of the base member, and to assure retaining the same in a fixed position.

The plate 12 is apertured at 19, 20, 21 and 22 to receive a pair of upright supports 23 and 24. Plate 13 is similarly apertured and arranged to receive the threaded ends 25 and 26 of the uprights 23 and 24. A slidable member 27, comprising a centrally disposed plate 28 and outer plates 29 and 30, is arranged for co-operation with the supports 23 and 24 and to carry a pair of carrier arms 31 and 32.

The plate 28 is provided with a pair of parallel grooves 33 and 34 on one side, and a pair of similar grooves 35 and 36 on the other side, which grooves extend at substantially right angles to the grooves 33 and 34. Inner plate 29 is provided with grooves 37 and 38, and the outer plate 30 is provided with grooves 39 and 40. The plates 28, 29 and 30 are centrally apertured to receive a bolt 41 having a threaded nut 42 carrying a handle 43.

When the device is to be used as illustrated in Figure 1, that is, to support a box within the area of the running board 10, the uprights 23 and 24 extend through the apertures 19 and 20, respectively, and are threaded into the apertures in the plate 13. The uprights extend through the openings provided by the grooves 33 and 38, and 34 and 37. After the box is placed in substantially the position desired, the carrier arms 31 and 32 are inserted in the openings formed by grooves 35 and 37, and 36 and 38. Adjustment of the slidable member 27 is then made, and the arms 31 and 32 are moved longitudinally so that the bent end portions embrace and engage the box, whereupon the handle 43 is rotated to bring the plates 28, 29 and 30 toward each other to retain the carrier arms and the entire slidable member in fixed position.

If desired, the end portions of the carrier arms may be provided with rubber shoes 44 to prevent mutilation of the articles carried.

While I have described the use of a single device for carrying luggage on the running board of an automobile, I am aware that the device may be used in numerous other ways.

When it is desired to carry, for instance, a box of greater width than the width of the running board of an automobile, it may be desired to employ two devices such as illustrated. In this case, the bases 11 are clamped to the running board adjacent the ends of the box, and the arms 31 and 32 are adjusted to extend at right angles to the position illustrated in Figure 1. To make the necessary adjustment, after loosening the slidable member 27, the upright 24 is removed from the position illustrated in Figure 2 and inserted in the aperture 21, and threaded into place as indicated in Figure 6. Then, before clamping the slidable member in fixed position, by operation of the handle 43, the arms may be adjusted to embrace the box which extends between the bases of two of the devices.

Having thus described my invention, what I claim is new and desire to secure by Letters Patent of the United States is:

1. A luggage carrier comprising a base provided with a pair of plates to hold said base on a support, a pair of uprights carried by the base, a slidable member comprising co-operating plates between which the uprights extend, a pair of carrier arms extending through the slidable member and supported thereby, a bolt extending through the co-operating plates, and a nut mounted on the bolt to retain the slidable member and carrier arms in fixed position.

2. A luggage carrier comprising a base provided with a pair of plates to hold said base upon a support, a pair of uprights carried by the base, a slidable member comprising co-operating plates between which the uprights extend, a pair of carrier arms extending through the slidable member and supported thereby, a bolt extending through the co-operating plates, and a nut mounted on the bolt to retain the slidable member and carrier arms in fixed position.

3. A luggage carrier comprising a base provided with a clamping member, a pair of uprights carried by the base, a slidable member through which the uprights extend, a pair of carrier arms extending through the slidable member and supported thereby, a bolt extending through the slidable member, and a nut mounted on the bolt to retain the slidable member and carrier arms in fixed position.

4. A luggage carrier comprising a base, a pair of uprights carried by the base, a slidable member through which the uprights extend, a pair of carrier arms extending through the slidable member and supported thereby, a bolt extending through the slidable member, and a nut mounted on the bolt to retain the slidable member and carrier arms in fixed position.

5. A luggage carrier comprising a support, a slidable member mounted on the support, said slidable member comprising a centrally disposed plate, a channeled groove on opposite faces of the plate, said grooves running at substantially right angles to each other, a pair of outer plates having grooves co-operating with the grooves in the central plate and arranged to embrace and engage the support and a carrier arm, and means to bring said plates toward each other.

6. A luggage carrier comprising a support, a slidable member mounted on the support, said slidable member comprising a centrally disposed plate, a channeled groove on opposite faces of the plate, said grooves running at substantially right angles to each other, a pair of outer plates arranged to co-operate with the support and a carrier arm, and means to lock the slidable member and carrier arm in fixed position.

7. A luggage carrier comprising a support, a slidable member mounted on the support, said slidable member comprising a centrally disposed plate and a pair of outer plates co-operating therewith to embrace and engage the support and a carrier arm, and means to retain said carrier arm and slidable member in fixed position.

8. A luggage carrier comprising a support, a locking member mounted on the support, said locking member comprising a centrally disposed plate and a pair of outer plates co-operating therewith to embrace and engage the support and a carrier arm, and means to retain said carrier arm and locking member in fixed position.

In witness whereof, I hereunto subscribe my name this 14th day of December, 1921.

WILLIAM V. OSBORNE.